(12) United States Patent
Zhang et al.

(10) Patent No.: US 12,474,027 B2
(45) Date of Patent: Nov. 18, 2025

(54) OPTICAL LENS, OPTICAL LENS GROUP, VEHICLE LAMP SYSTEM, AND VEHICLE

(71) Applicant: HASCO VISION TECHNOLOGY CO., LTD., Shanghai (CN)

(72) Inventors: Jie Zhang, Shanghai (CN); Shikun Dong, Shanghai (CN); Fan Meng, Shanghai (CN); Jiayuan Chen, Shanghai (CN)

(73) Assignee: HASCO VISION TECHNOLOGY CO., LTD., Shanghai (CN)

( * ) Notice: Subject to any disclaimer, the term of this patent is extended or adjusted under 35 U.S.C. 154(b) by 261 days.

(21) Appl. No.: 17/922,142

(22) PCT Filed: Feb. 2, 2021

(86) PCT No.: PCT/CN2021/074835
§ 371 (c)(1),
(2) Date: Oct. 28, 2022

(87) PCT Pub. No.: WO2021/218265
PCT Pub. Date: Nov. 4, 2021

(65) Prior Publication Data
US 2023/0213162 A1    Jul. 6, 2023

(30) Foreign Application Priority Data

Apr. 30, 2020   (CN) .................. 202010367179.X
Jul. 1, 2020    (CN) .................. 202010628888.9

(51) Int. Cl.
*F21S 41/27*   (2018.01)
*F21S 41/32*   (2018.01)

(52) U.S. Cl.
CPC .............. *F21S 41/27* (2018.01); *F21S 41/32* (2018.01)

(58) Field of Classification Search
CPC ................................ F21S 41/27; F21S 41/32
(Continued)

(56) References Cited

U.S. PATENT DOCUMENTS

2018/0320852 A1    11/2018   Mandl
2019/0186706 A1*   6/2019    Kim ..................... F21S 41/285
2019/0293948 A1    9/2019    Ramthun et al.

FOREIGN PATENT DOCUMENTS

CN    101086531    12/2007
CN    202083837    12/2011
(Continued)

OTHER PUBLICATIONS

International Search Report, International Patent Application No. PCT/CN2021/074835, dated Apr. 29, 2021, 3 pages.
(Continued)

*Primary Examiner* — Thomas M Sember
(74) *Attorney, Agent, or Firm* — Casimir Jones, S.C.; Robert A. Goetz

(57) ABSTRACT

An optical lens, including a light incident portion and a light emergent portion, wherein a first single-directional alignment surface (1) is formed on the light incident portion; a second single-directional alignment surface (2) is formed on the light emergent portion; the alignment direction of the first single-directional alignment surface (1) is perpendicular to the alignment direction of the second single-directional alignment surface (2); and the first single-directional alignment surface (1) and the second single-directional alignment surface (2) jointly form a focal point or a focusing area of the optical lens. In addition, an optical lens group, a vehicle lamp system and a vehicle are further provided. The optical lens can meet the requirement for anisotropy of the illumination light shape of the vehicle lamp, and can form an asymmetrical light shape.

20 Claims, 11 Drawing Sheets

(58) Field of Classification Search
USPC .......................................................... 362/268
See application file for complete search history.

(56) References Cited

FOREIGN PATENT DOCUMENTS

| | | |
|---|---|---|
| CN | 102879908 | 1/2013 |
| CN | 202886733 | 4/2013 |
| CN | 103728809 A | 4/2014 |
| CN | 203519855 | 4/2014 |
| CN | 104076365 | 10/2014 |
| CN | 105143962 | 12/2015 |
| CN | 206330082 | 7/2017 |
| CN | 108253372 | 7/2018 |
| CN | 108302470 A | 7/2018 |
| CN | 108549085 | 9/2018 |
| CN | 108779902 A | 11/2018 |
| CN | 109958958 | 7/2019 |
| CN | 212618084 | 2/2021 |
| DE | 102017202486 | 8/2017 |
| DE | 102017117376 | 2/2019 |
| FR | 3047940 | 8/2017 |
| JP | 59-8202 | 1/1984 |
| JP | H04-106802 | 9/1992 |
| JP | 2003100112 | 4/2003 |
| JP | 2017-147153 | 8/2017 |
| JP | 2018-41664 | 3/2018 |
| WO | 2019/025351 | 2/2019 |

OTHER PUBLICATIONS

Decision to Grant, JP Patent Application No. 2022-561683, dated Apr. 9, 2024, 3 pages.
EP Search Report, EP Patent Application No. 21796757.9, dated Jul. 27, 2023, 4 pages.
Office Action, DE Patent Application No. 112021002606.2, dated Feb. 8, 2024, 9 pages.
Office Action, EP Patent Application No. 21796757.9, dated Aug. 10, 2023, 7 pages.
Office Action, JP Patent Application No. 2022-561683, dated Oct. 23, 2023, 5 pages.
Office Action, CN Patent Application No. 202010628888.9, dated Dec. 13, 2024, 7 pages.

* cited by examiner

OPTICAL LENS, OPTICAL LENS GROUP, VEHICLE LAMP SYSTEM, AND VEHICLE

CROSS-REFERENCE TO RELATED APPLICATIONS

The present application claims the priorities of Chinese patent application filed on Apr. 30, 2020 with No. 202010367179.X and Chinese patent application filed on Jul. 01, 2020 with No. 202010628888.9, the contents of which are incorporated herein by reference.

TECHNICAL FIELD

The present application relates to vehicle optical elements, in particular, to an optical lens. Furthermore, it relates to an optical lens group, a vehicle lamp system having the optical lens or the optical lens group, and a vehicle having the vehicle lamp system.

BACKGROUND ART

The vehicle lamps refer to lamps on a vehicle, which are lighting tools for vehicles driving on road at night, and also prompt tools for issuing various driving signals of a vehicle. The vehicle lamps play a very important role in terms of ensuring the safe driving of vehicles. With development of society and economy, the automobile industry also develops, and with continuous development of automobile lighting technology, more requirements are proposed for functions of vehicle lamps.

In a lighting module that realizes the lighting function of a vehicle lamp, collimating optical elements are usually provided to obtain approximately parallel outgoing light, for example, a hyperboloid collimating lens is provided, the curved surface on which is a revolving surface based on the optical axis of the lens, with the imaging characteristics being isotropic.

However, it is required that the light shape of lighting of the vehicle lamp is anisotropic, for example, the upper and lower lighting angle is small, and the left and right lighting angle is large. For this reason, the vehicle lamp lighting system based on the above-mentioned collimating lens needs to form the fundamental light shape with a certain width through an additional optical system, and the light shape is then imaged to the road surface through the collimating lens, which makes the structure relatively complex.

Therefore, a new type of optical lens needs to be designed to overcome or alleviate the above-mentioned technical problems.

SUMMARY

A technical problem to be solved by the present application is to provide an optical lens, which can meet the requirement that the light shape of lighting of the vehicle lamp is anisotropy to form an asymmetric light shape.

A further technical problem to be solved by the present application is to provide an optical lens group, which can meet the requirement that the light shape of the lighting of the vehicle lamp is anisotropy, so as to form an asymmetric light shape.

A further technical problem to be solved by the present application is to provide a vehicle lamp system, which can reduce the structural size of the vehicle lamp.

In addition, a technical problem to be solved by the present application is to provide a vehicle with better lighting effect.

In order to achieve the above objects, the technical solutions of the present application are achieved in following way.

An optical lens comprising a light incident portion and a light emergent portion, wherein the light incident portion is formed with a first single-directional alignment surface, and the light emergent portion is formed with a second single-directional alignment surface, an alignment direction of the first single-directional alignment surface and an alignment direction of the second single-directional alignment surface are perpendicular to each other, and the first single-directional alignment surface and the second single-directional alignment surface jointly form a focal point or focus area of the optical lens.

Preferably, each of the first single-directional alignment surface and the second single-directional alignment surface is a curved surface formed by stretching an collimating curve along a normal direction of a plane where the collimating curve is located.

More preferably, each of the first single-directional alignment surface and the second single-directional alignment surface is a cylindrical or quasi-cylindrical surface.

Further, each of the first single-directional alignment surface and the second single-directional alignment surface is a circular cylindrical surface.

Preferably, each of the first single-directional alignment surface and the second single-directional alignment surface is a stepped Fresnel cylindrical surface.

Further, one of the first single-directional alignment surface and the second single-directional alignment surface is a cylindrical surface, and the other is a stepped Fresnel cylindrical surface.

Particularly, one of an alignment direction of the first single-directional alignment surface and an alignment direction of the second single-directional alignment surface is a vertical direction, and the other is a horizontal direction.

More particularly, the first single-directional alignment surface and the second single-directional alignment surface cooperate with each other to make focal lengths on both sides of the optical lens different, such that an asymmetric light shape can be formed.

Moreover, the present application also provides an optical lens group, comprising a first single-directional collimating lens group and a second single-directional collimating lens group, wherein the first single-directional collimating lens group and the second single-directional collimating lens group jointly form a focal point or a focus area of the optical lens group, and an alignment direction of the first single-directional collimating lens group and an alignment direction of the second single-directional collimating lens group are perpendicular to each other.

Preferably, each of the first single-directional collimating lens group and the second single-directional collimating lens group is composed of at least one single-directional collimating lens.

More preferably, one of an incident surface and an emergent surface of the single-directional collimating lens is a single-directional collimating curved surface, or both of them are single-direction collimating curved surfaces with the same collimating direction.

Optionally, the first single-directional collimating lens group and the second single-directional collimating lens group are connected by a side wall.

Additionally, the present application also provides a vehicle lamp system, comprising the optical lens or the optical lens group according to any of the technical solutions mentioned above.

Typically, it further comprises a light source, wherein the light source is arranged at a focal point or a focus area of the optical lens or the optical lens group; or, it further comprises a light source and a primary optical element, wherein the primary optical element is arranged to be able to converge light emitted by the light source to the focal point or the focus area of the optical lens or the optical lens group and introduce it into the optical lens or the optical lens group.

In addition, the present application also provides a vehicle, comprising the vehicle lamp system according to any of the technical solutions mentioned above.

Through the above-mentioned technical solutions, the beneficial effects of the present application are as follows.

In the basic technical solution of the present application, the optical lens of the present application includes a first single-directional alignment surface and a second single-directional alignment surface, and the first single-directional alignment surface has the characteristics of single-directional collimation of the light. For example, there is no refraction or at most only very weak refraction in one section direction of the first single-directional alignment surface (the cutting curve is almost a straight line). Meanwhile, it has the greatest refraction effect in the direction perpendicular to this section, that is, the alignment direction of the first single-directional alignment surface is single-directional. The second single-directional alignment surface also has the same characteristics of single-directional collimation of the light, that is, the alignment direction of the second single-directional alignment surface is also single-directional. However, the alignment direction of the first single-directional alignment surface and the alignment direction of the second single-directional alignment surface are perpendicular to each other, so that an asymmetric light shape can be formed. Here, the asymmetric light shape mainly refers to that when a square light-emitting surface is imaged, the light shape presents a rectangle, rather than the isotropic approximately square light shape formed by the existing collimating lens. Moreover, the optical lens has a focal point or a focal area. When the light source is placed near the focal point or inside the focal area, a better optical effect can be obtained, and a higher utilization rate of light energy can be achieved.

In addition, the present application can also realize the same function as the above-mentioned optical lens in the form of an optical lens group.

Other advantages of the present application and the technical effects of the preferred embodiments will be further described in the following embodiments.

Figure 1:
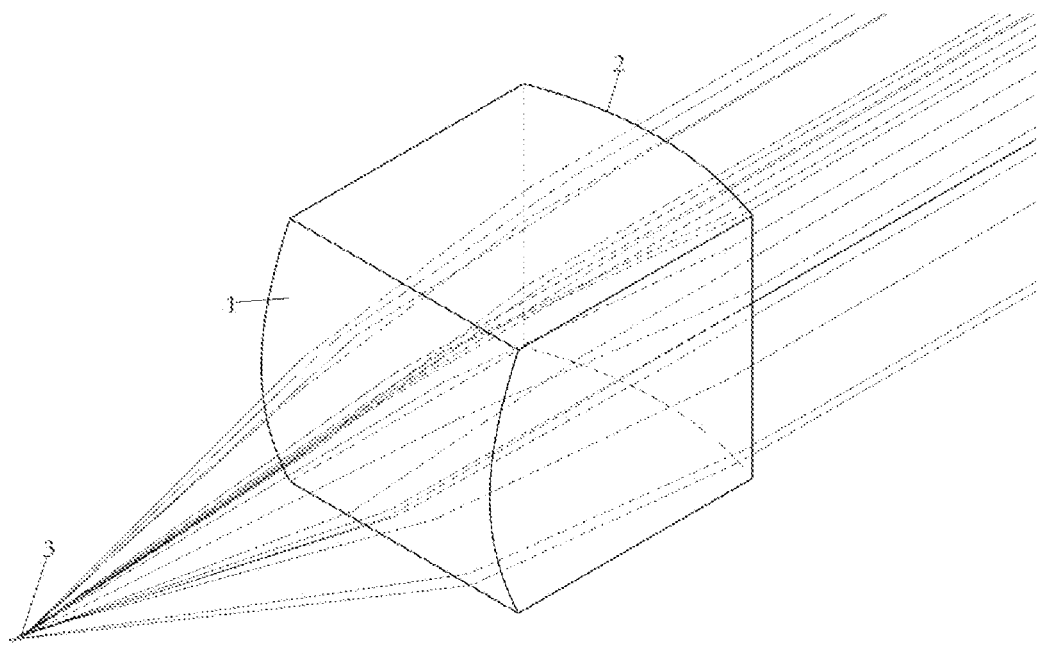
FIG. 1 is a schematic diagram of a three-dimensional optical path of an optical lens of a first embodiment of the present application.

DESCRIPTION OF REFERENCE NUMERALS 1 first single-directional alignment surface 2 second single-directional alignment surface 3 light source 4 primary optical element

5 existing hyperboloid collimating lens 6 first single-directional collimating lens group

7 second single-directional collimating lens group.

DETAILED DESCRIPTION OF EMBODIMENTS

The embodiments of the present application will be described in detail below with reference to the drawings. It should be understood that the embodiments described herein are only used to illustrate and explain the present application, but not to limit the present application.

In addition, the terms, "first" and "second", are only used for the purpose of description, and cannot be understood as indicating or implying importance of relativity or indicating the number of technical features indicated. Thus, a feature defined by "first" and "second" may expressly or implicitly includes one or more of the stated features.

In the description of the present application, it should be noted that, unless expressly specified and limited otherwise, the terms "providing" and "arranging" should be understood in a broad sense, for example, it may be a fixed connection, a detachable connection, or an integral connection; it may be a direct connection or an indirect connection through an intermediate medium, and it also may be the internal communication of two elements or the interaction relationship between the two elements. For those skilled in the art, the specific meanings of the above terms in the present application can be understood according to specific situations.

It should be understood that, in order to facilitate the description of the present application and simplify the description, the terms, "horizontal" and "vertical", are orientation terms related to the installation direction of the optical lens on the vehicle. Generally speaking, the light emergent direction of the optical lens is roughly the same as the light emergent direction of the vehicle. The terms are based on the orientation or position relationship shown in the drawings, and are not intended to indicate or imply that the referred device or element must be at a particular orientation or be constructed and operated in a particular orientation, therefore should not be construed as limiting the invention. Also, the orientation terms of the present application should be understood in conjunction with the actual installation state.

As shown in FIG. 1, FIG. 2, and FIG. 4 to FIG. 16, the optical lens according to the basic embodiment of the present application includes a light incident portion and a light emergent portion, wherein the light incident portion is provided with a first single-directional alignment surface 1, and the light emergent portion is provided with a second single-directional alignment surface 2, the alignment direction of the first single-directional alignment surface 1 and the alignment direction of the second single-directional alignment surface 2 are perpendicular to each other, and the first single-directional alignment surface 1 and the second single-directional collimating surface 2 jointly form a focal point or a focus area of the optical lens.

In actual use, generally, the alignment directions of the first single-directional alignment surface 1 and the second single-directional alignment surface 2 of the optical lens are approximately the same as the vertical and horizontal directions of the vehicle, that is, the alignment direction of the first single-directional alignment surface 1 is limited to the horizontal direction or the vertical direction, and correspondingly, the alignment direction of the second single-directional alignment surface 2 is limited to the vertical direction or the horizontal direction. In order to simplify the description, the optical lens of the present application will be described mainly with an example in which the alignment direction of the first single-directional alignment surface 1 is limited to the horizontal direction and the alignment direction of the second single-directional alignment surface 2 is limited to the vertical direction.

Figure 2:
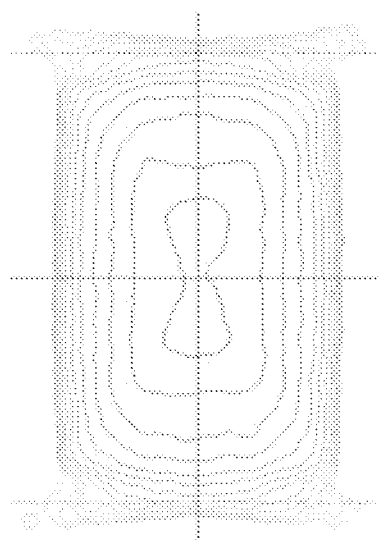
FIG. 2 is screen illuminance diagram of a light shape of an optical lens of an embodiment of the present application.
Figure 3:
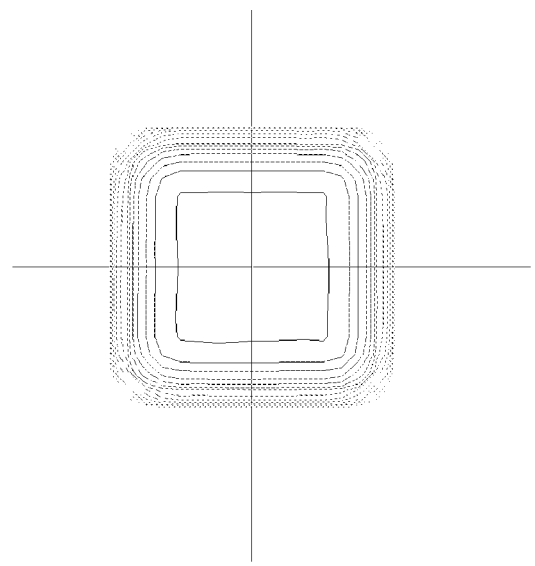
FIG. 3 is screen illuminance diagram of a light shape when a square light-emitting surface is imaged by an existing lens.
Figure 4:
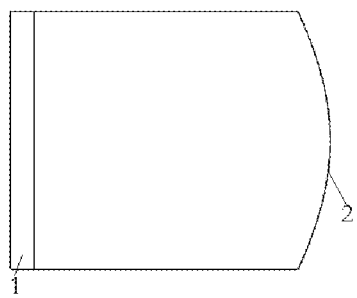
FIG. 4 is the top view of the optical lens in FIG. 1.
Figure 5:
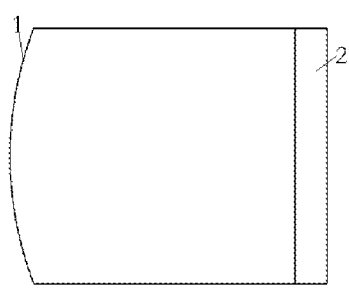
FIG. 5 is the front view of the optical lens in FIG. 1.
Figure 6:
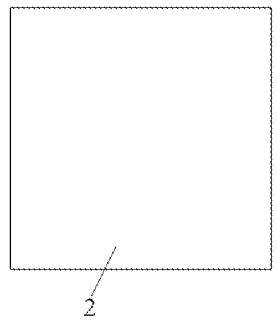
FIG. 6 is the right view of the optical lens in FIG. 1.
Figure 15:
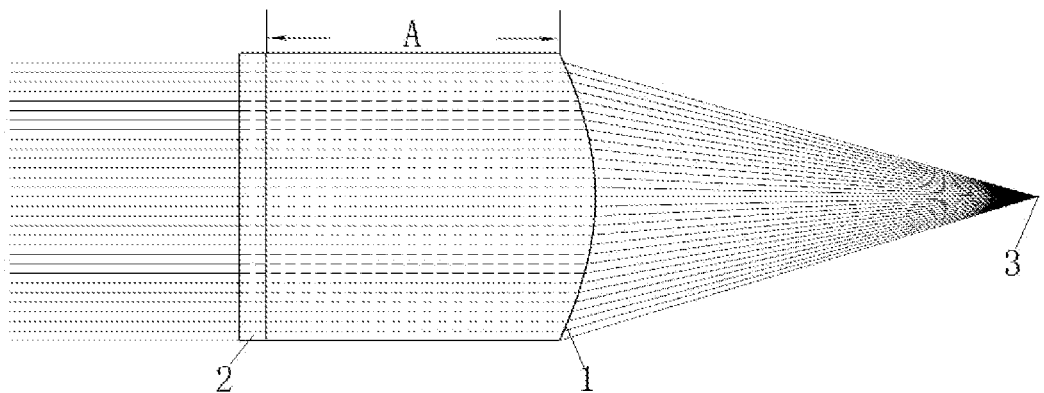
FIG. 15 is the first one of the schematic diagrams of the optical path of the optical lens of the fourth embodiment of the present application.
Figure 16:
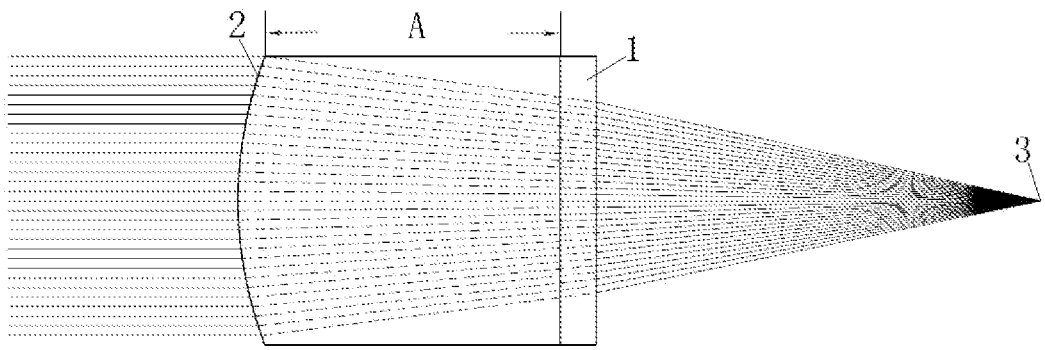
FIG. 16 is the second one of the schematic diagrams of the optical path of the optical lens of the fourth embodiment of the present application.

In the above basic technical solution, the first single-directional alignment surface 1 has the optical characteristics of single-directional collimation of the light emitted by the light source 3. The "alignment direction" can be understood as follows. In a horizontal section, referring to FIG. 15, the first single-directional alignment surface 1 produces a converging effect, which can have a certain collimation effect on the light r. Compared with FIG. 16, in a vertical section, the first single-directional alignment surface 1 has no refraction effect or at most only a very weak refraction effect on the light, (the cutting curve in the vertical direction is almost a straight line), that is, the first single-directional alignment surface 1 has a single-direction collimation effect on the light in the position range of the horizontal section. In other words, the alignment direction of the first single-directional alignment surface 1 is limited in the horizontal direction. The second single-directional alignment surface 2 has the optical characteristics of single-directional collimating the light emitted by the light source 3, which is similar to the first single-directional alignment surface 1, but the difference is: in the horizontal section, the second single-directional alignment surface 2 has no or at best a very weak refraction effect on the light; and in the vertical section, the second single-directional alignment surface 2 produces a converging effect, which can have a certain collimation effect on the light, that is, the second single-directional alignment surface 2 has a single-direction collimation effect on the light in the position range of the vertical section, that is to say, the alignment direction of the second single-directional alignment surface 2 is limited in the vertical direction. Therefore, the alignment direction of the first single-directional alignment surface 1 and the alignment direction of the second single-directional alignment surface 2 are perpendicular to each other. Referring to FIGS. 15 and 16, there is a lens thickness A between the first single-directional alignment surface 1 and the second single-directional alignment surface 2, and the first single-directional alignment surface 1 is closer to the focal point or the focus area so that it has a smaller focal length relative to the second single-directional alignment surfaces 2; and according to the imaging principle, the smaller the focal length, the larger the formed image, so that there is a difference in imaging between the first single-directional alignment surface 1 and the second single-directional alignment surface 2. In the alignment direction of the first single-directional alignment surface 1 close to the focus point or the focus area, the imaging thereof is larger than that in the alignment direction of the second single-directional alignment surface 2, that is, the diffusion degree of the light of the light source 3 in the alignment direction of the first single-directional alignment surface 1 is, after it passes through the optical lens, greater than the diffusion degree of the light thereof in the alignment direction of the second single-directional alignment surface 2. The imaging difference is determined by the refractive index of the lens and the lens thickness A between the first single-directional alignment surface 1 and the second single-directional alignment surface 2. In this way, the light source 3 with a square light-emitting surface is arranged near the focal point or in the focal area of the optical lens, so that the light emitted by the light source 3 pass through the first single-directional alignment surface 1 and the second single-directional alignment surface 2 in sequence to form an asymmetric light shape. Here, "asymmetric light shape" means that the length and width of the light shape are quite different from each other, such as a rectangular light shape. For example, when the second single-directional alignment surface 2 stretched in the horizontal direction is combined with the first direction alignment surface 1 stretched in the vertical direction, so that the diffusion degree of the light in the horizontal direction is greater than that in the vertical direction, a light shape that is wider in the horizontal direction and relatively narrow in the vertical direction can be obtained. On the contrary, when the second single-directional alignment surface 2 stretched in the vertical direction is combined with the first direction alignment surface 1 stretched in the horizontal direction, so that the diffusion degree of light in the vertical direction is greater than that in the horizontal direction, a light shape that is wider in the vertical direction and relatively narrow in the horizontal direction can be obtained, as shown in FIG. 2. FIG. 3 is a screen illuminance diagram of a light shape when a conventional lens images a square light-emitting surface. Comparing the light shapes in FIG. 2 and FIG. 3, it is obvious that the light shapes obtained by the optical lens of the present invention have obvious asymmetry.

Figure 13:
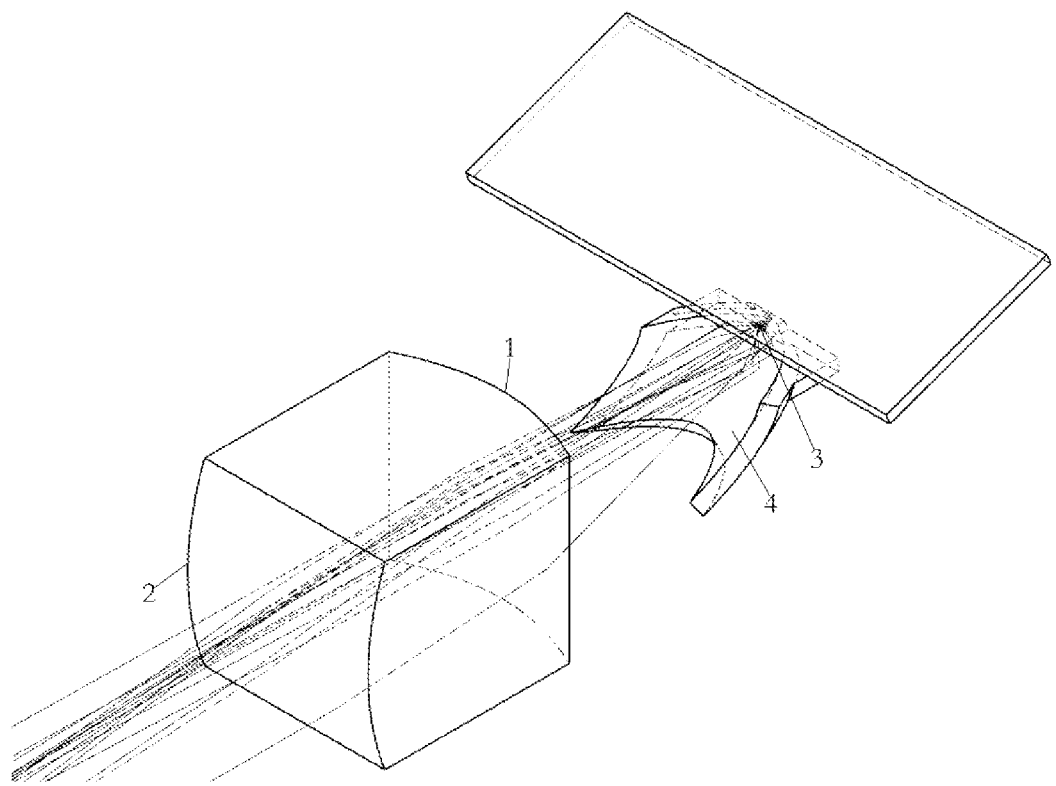
FIG. 13 is a schematic diagram of a three-dimensional optical path of a vehicle lamp system of a fourth embodiment of the present application, wherein the optical lens is the optical lens of the first embodiment.

Specifically, as shown in FIGS. 13, 15 and 16, the first single-directional alignment surface 1 can be regarded as a curved surface which is formed by stretching the collimating curve in the horizontal section along the normal direction of the plane where the collimating curve is located, that is, the curved surface formed by stretching in the vertical direction. Similarly, the second single-directional alignment surface 2 can be regarded as a curved surface which is formed by stretching the alignment curve in the vertical section along the normal direction of the plane where the alignment curve is located, that is, the curved surface formed by stretching in the horizontal direction.

Further, the curved surface formed by the first single-directional alignment surface 1 and the curved surface formed by the second single-directional alignment surface 2 can be cylindrical surfaces. The cylindrical surface can be understood as such an optical curved surface that, taking the first single-directional alignment surface 1 as an example, it produces a converging effect in the horizontal section and can have a certain collimation effect on the light; and it produces, in the vertical section, no refraction or at most only a very weak refraction effect on the light (the cutting curve in the vertical direction is almost a straight line). Wherein, the cutting curve in the horizontal direction does not have to be arc-shaped. Further, the curved surface formed by the first single-directional alignment surface 1 and the curved surface formed by the second single-directional alignment surface 2 may be cylindrical-like surfaces. The cylindrical-like surface refers to a curved surface that is close to a cylindrical surface in shape, and also has a technical effect similar to the above-mentioned cylindrical surface. Preferably, the cutting curve of the cylindrical surface formed by the first single-directional alignment surface 1 in the horizontal direction can be arc-shaped, and similarly, it is also applies to the cylindrical surface structure formed by the second single-directional alignment surface 2.

Moreover, the asymmetry of the asymmetric light shape formed by the above technical solution is caused by the difference in focal lengths on both sides of the optical lens. In other words, it is related to the ratio of: the magnification of the first single-directional alignment surface 1 to the light shape to the magnification of the second single-directional alignment surface 2 to the light shape, while the ratio of the magnification is determined by the spacing between the first single-directional alignment surface 1 and the second single-directional alignment surface 2. The larger the spacing is, the greater the ratio is, and the more obvious the asymmetry is. When the optical lens in FIG. 13 is compared with the optical lens shown in FIG. 7, the thickness of the optical lens can be reduced if the ratio is small.

In addition, as shown in FIGS. 9 to 12, the first single-directional alignment surface 1 and the second single-directional alignment surface 2 may also be stepped Fresnel cylindrical surfaces. The so-called "stepped Fresnel cylindrical surface" refers to that it is obtained by means of stretching the Fresnel curve and has a single-directional collimation effect on the light. The so-called "Fresnel curve" refers to a curve shape in which the plane passing through the optical axis of the Fresnel lens has the same or similar shape as the intersection line of the surface of the Fresnel lens having a plurality of concentric circles.

Further, the stepped Fresnel cylindrical surface is formed by a series of cylindrical surface structures being arranged horizontally or vertically.

The stepped Fresnel cylindrical surface structure and the above cylindrical structure can both collimate the light. The stepped Fresnel cylindrical surface formed by the first single-directional alignment surface 1 and the stepped Fresnel cylindrical surface formed by the second single-directional alignment surface 2 are arranged as perpendicular to each other, and can also form asymmetric light shapes.

In the above, two technical solutions in which the first single-directional alignment surface 1 and the second single-directional alignment surface 2 adopt a cylindrical surface or a stepped Fresnel cylindrical surface are descripted respectively. It can be understood that the first single-directional alignment surface 1 and the second single-directional alignment surface 2 can be performed a simple deformation, such as, the first single-directional alignment surface 1 is a cylindrical surface and the second single-directional alignment surface 2 is a stepped Fresnel cylindrical surface, or the first single-directional alignment surface 1 is a stepped Fresnel cylindrical surface and the second single-directional alignment surface 2 is a cylindrical surface, as long as the alignment directions of the two are perpendicular to each other.

It should be noted that the optical lens of the present application is described above, with the example in which the alignment direction of the first single-directional alignment surface 1 is in the horizontal direction and the alignment direction of the second single-directional alignment surface 2 is in the vertical direction. However, the above embodiments are also applicable to the case where the alignment direction of the first single-directional alignment surface 1 is in the vertical direction and the alignment direction of the second single-directional alignment surface 2 is in the horizontal direction. For example, in the embodiment of FIG. 1, from the perspective of the arrangement orientation of the optical lens in FIG. 1, the alignment direction of the cylindrical surface on the first single-directional alignment surface 1 is in the vertical direction, and the alignment direction of the cylindrical on the second single-directional alignment surface 2 is in the horizontal direction. Alternatively, in the embodiment of FIG. 12, from the perspective of the arrangement orientation of the optical lens in FIG. 12, the stepped Fresnel cylindrical surface on the first single-directional alignment surface 1 extends in the horizontal direction, and the alignment direction thereof is in the vertical direction, and the stepped Fresnel cylindrical surface on the second single-direction alignment surface 2 extends in the vertical direction, and the alignment direction is in the horizontal direction.

Figure 19:
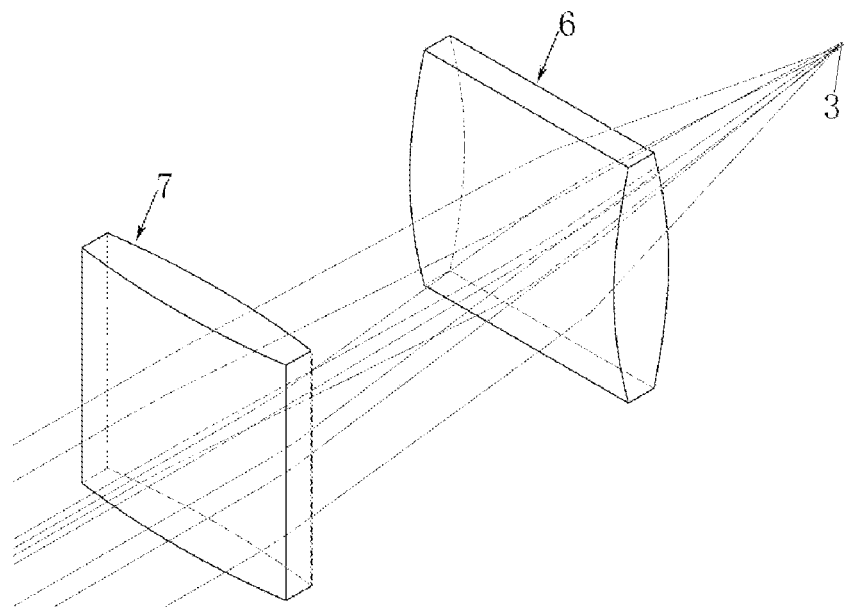
FIG. 19 is a schematic diagram of a three-dimensional optical path of an optical lens group of a fifth embodiment of the present application.
Figure 20:
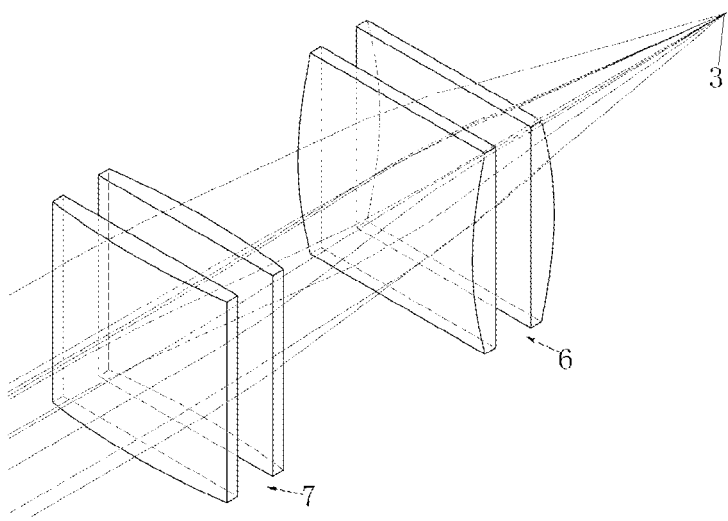
FIG. 20 is a schematic diagram of a three-dimensional optical path of an optical lens group of a sixth embodiment of the present application, wherein the first single-directional collimating lens group and the second single-directional collimating lens group are both composed of two single-directional collimating lenses.
Figure 21:
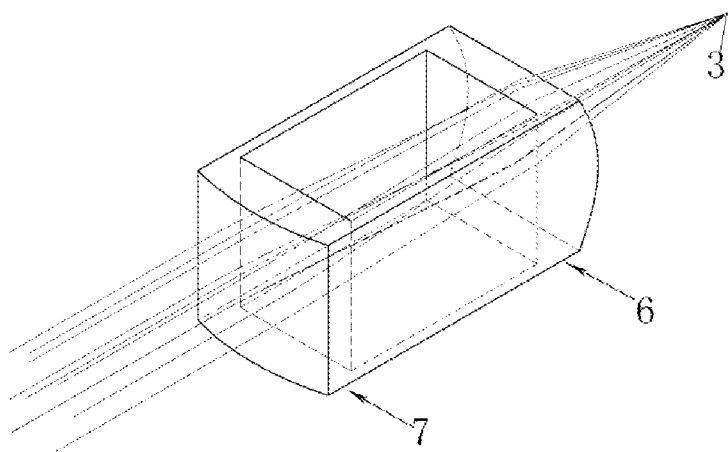
FIG. 21 is a schematic diagram of a three-dimensional optical path of an optical lens group of to a seventh embodiment of the present application, wherein the first single-directional collimating lens group and the second single-directional collimating lens group are connected by a side wall.
Figure 22:
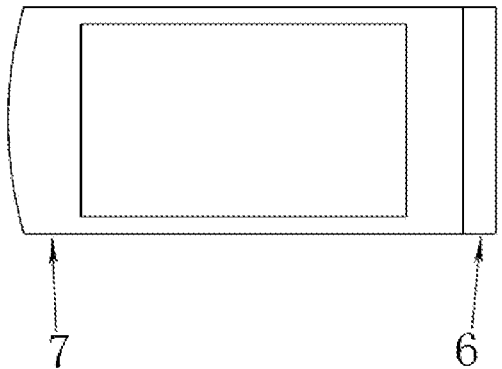
FIG. 22 is a top view of the optical lens group in FIG. 21.
Figure 23:
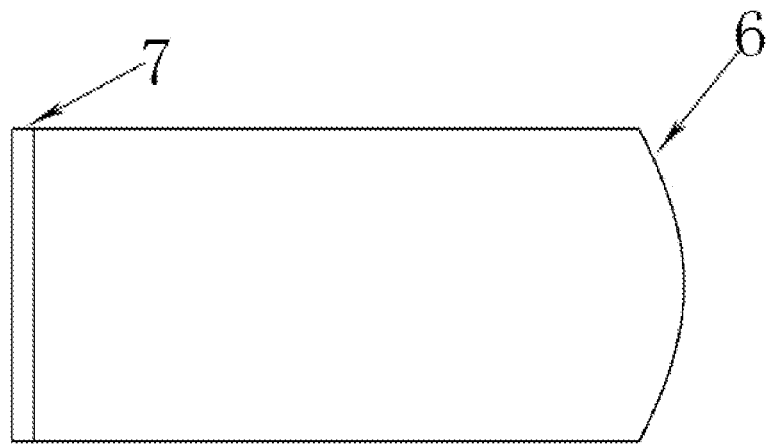
FIG. 23 is a front view of the optical lens group in FIG. 21.
Figure 24:
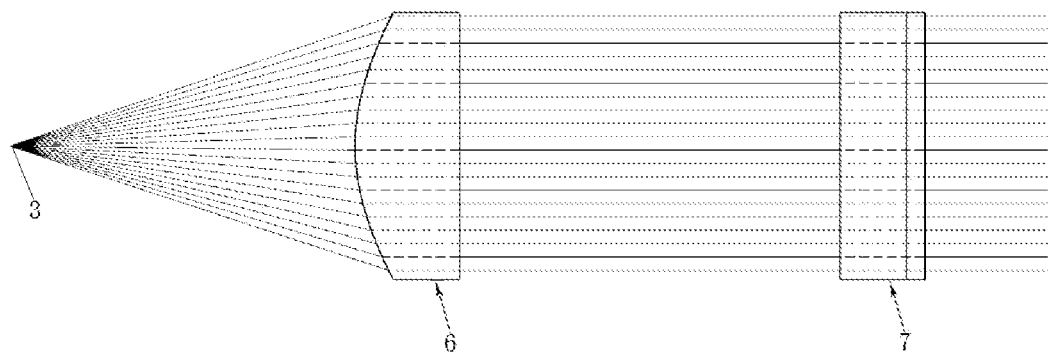
FIG. 24 is the first one of the schematic diagrams of the optical path of the optical lens group of the seventh embodiment of the present application.
Figure 25:
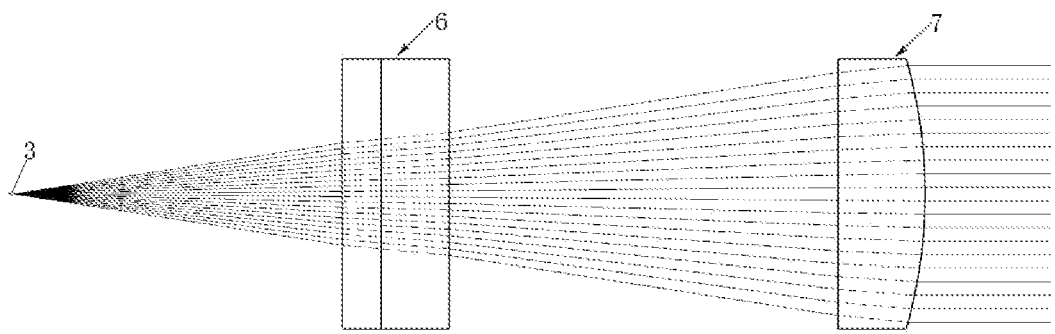
FIG. 25 is the second one of the schematic diagrams of the optical path of the optical lens group of the seventh embodiment of the present application.

The structure of the optical lens is designed above. The asymmetric light shape is formed by providing in the light incident portion and the light emergent portion of the optical lens the first single-directional alignment surface 1 and the second single-directional alignment surface 2 with the alignment directions perpendicular to each other. Of course, the optical lens of the present application can also be designed in the form of the structure of an optical lens group. Further, as shown in FIGS. 19 to 25, it is composed of the first single-directional collimating lens group 6 and the second single-directional collimating lens group 7, wherein the first single-directional collimating lens group 6 and the second single-directional collimating lens group 7 jointly form the focus point or the focus area of the optical lens group of the present application, and the alignment direction of the first single-directional collimating lens group 6 and the alignment direction of the second single-directional collimating lens group 7 are perpendicular to each other. Similarly to the optical lens of the present application, it can be seen from the optical paths shown in FIGS. 24 and 25 that, the first single-directional collimating lens group 6 and the second single-directional collimating lens group 7 respectively have the optical characteristics of one-directional collimation on the light emitted by the light source 3, that is, the collimation direction of the first single-directional collimating lens group 6 is the horizontal direction, and the collimation direction of the second single-directional collimating lens group 7 is the vertical direction. Specifically, the first single-directional collimating lens group 6 and the second single-directional collimating lens group 7 are both composed of at least one single-directional collimating lens. For example, FIG. 19 shows an example in which the first single-directional collimating lens group 6 and the second single-directional collimating lens group 7 are both composed of one single-directional collimating lens. FIG. 20 shows an example in which the first single-directional collimating lens group 6 and the second single-directional collimating lens group 7 are both composed of two single-directional collimating lenses. It can be understood that the first single-directional collimating lens group 6 and the second single-directional collimating lens group 7 both can be composed of multiple single-directional collimating lenses, as long as the first single-directional collimating lens group 6 and the second single-directional collimating lens group 7 have the optical characteristics of single-directional collimation; that is, the collimating directions of the multiple single-directional collimating lenses in the first single-directional collimating lens group 6 are the same, and the collimating directions of the multiple single-directional collimating lenses in the second single-directional collimating lens group 7 are the same. In other word, it is possible that, as shown in FIG. 24 or 25, the incident surface or the emergent surface of the single-directional collimating lenses is a single-directional collimating curved surface; or, it is also possible that, as shown in FIG. 19, each of the incident surface and the emergent surface of the single-directional collimating lens is a single-directional collimating curved surface. Here, the "single-directional collimating curved surface" refers to a curved surface having the same functions as the first single-directional alignment surface 1 or the second single-directional alignment surface 2 of the optical lens of the present application, and can specifically be a cylindrical surface, a cylinder-like surface or a stepped Fresnel cylindrical surface, etc. Further, as shown in FIGS. 21 to 23, the two ends of the first single-directional collimating lens group 6 and the two ends of the second single-directional collimating lens group 7 are correspondingly respectively connected through the side walls, and the two are connected into one piece, which effectively ensures the stability of the optical system.

Figure 7:
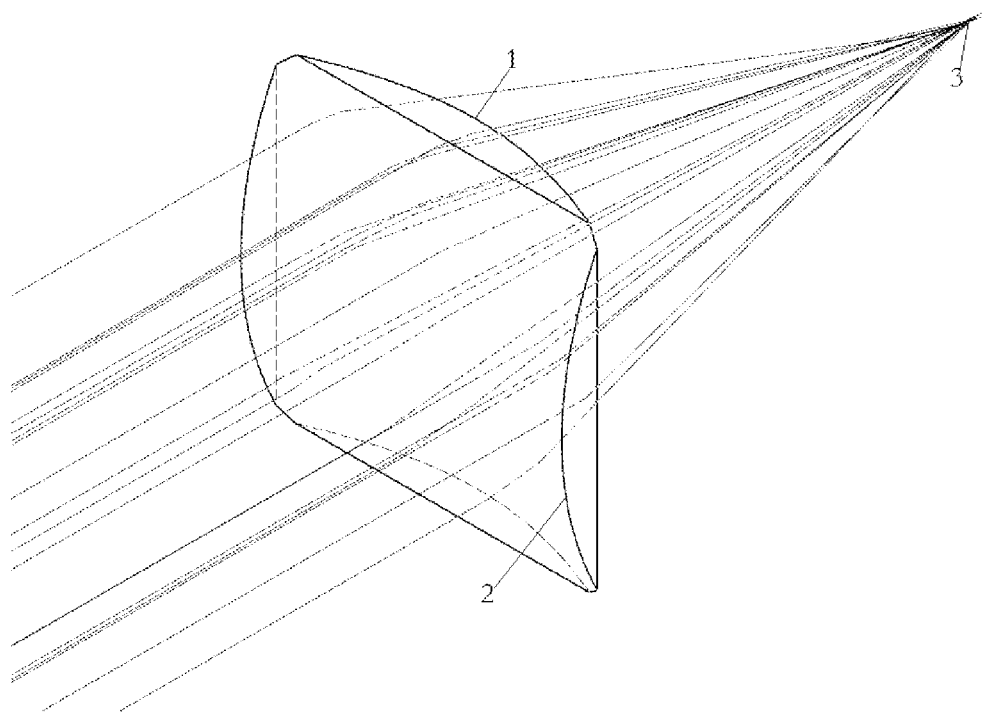
FIG. 7 is a schematic diagram of a three-dimensional optical path of an optical lens of a second embodiment of the present application.
Figure 8:
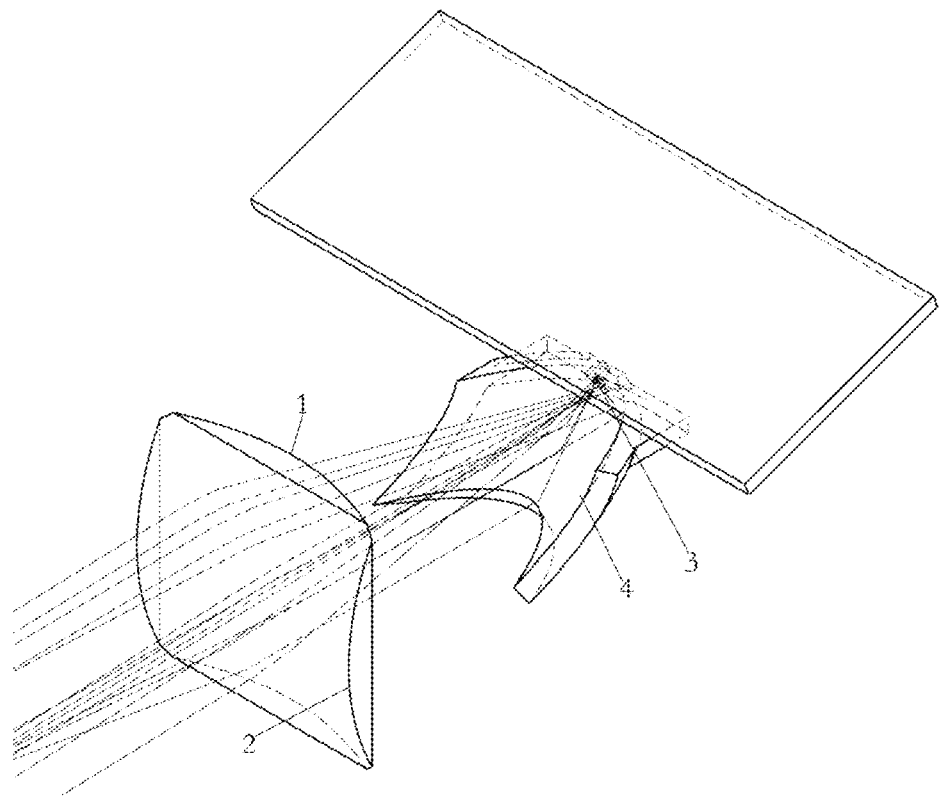
FIG. 8 is a schematic diagram of a three-dimensional optical path of a vehicle lamp system of an embodiment of the present application, wherein the optical lens is the optical lens of the second embodiment.
Figure 9:
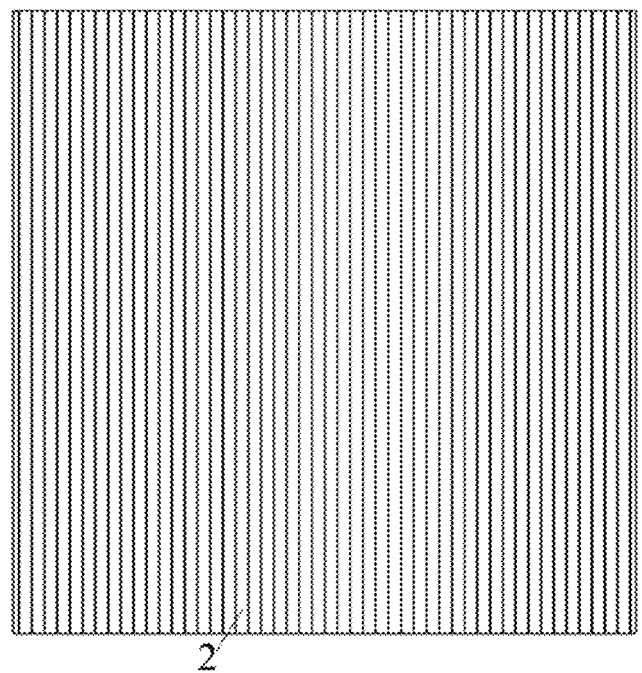
FIG. 9 is a front view of the structure of the optical lens of the third embodiment of the present application.
Figure 10:
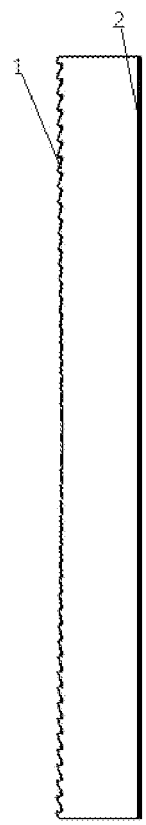
FIG. 10 is a left view of the structure of the optical lens of the third embodiment of the present application.
Figure 11:
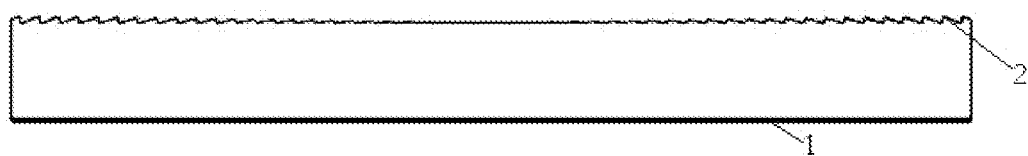
FIG. 11 is a bottom view of the structure of the optical lens of the third embodiment of the present application.
Figure 12:
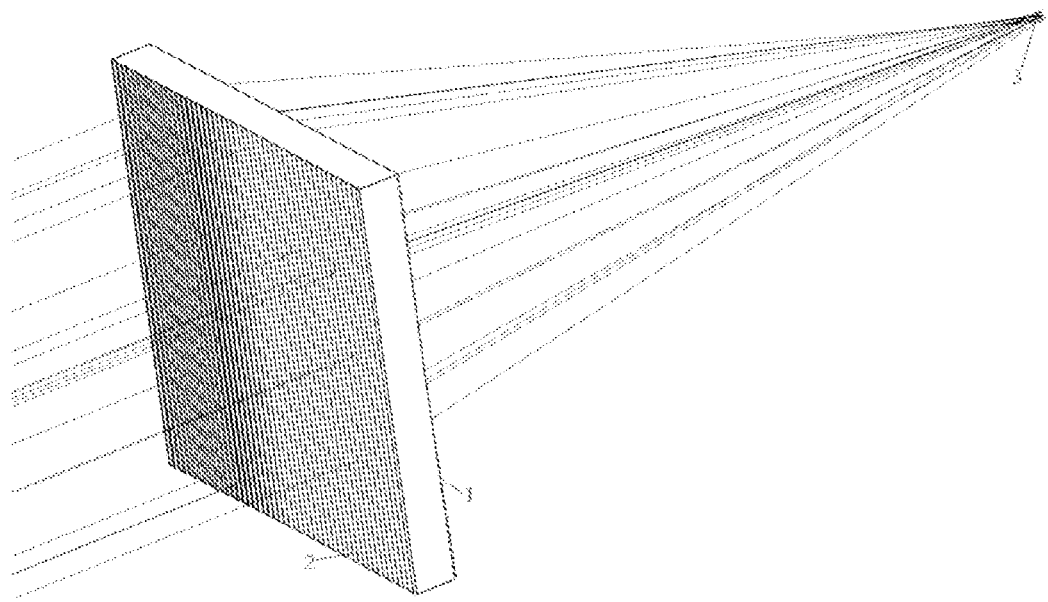
FIG. 12 is a schematic diagram of a three-dimensional optical path of an optical lens of a third embodiment of the present application.
Figure 14:
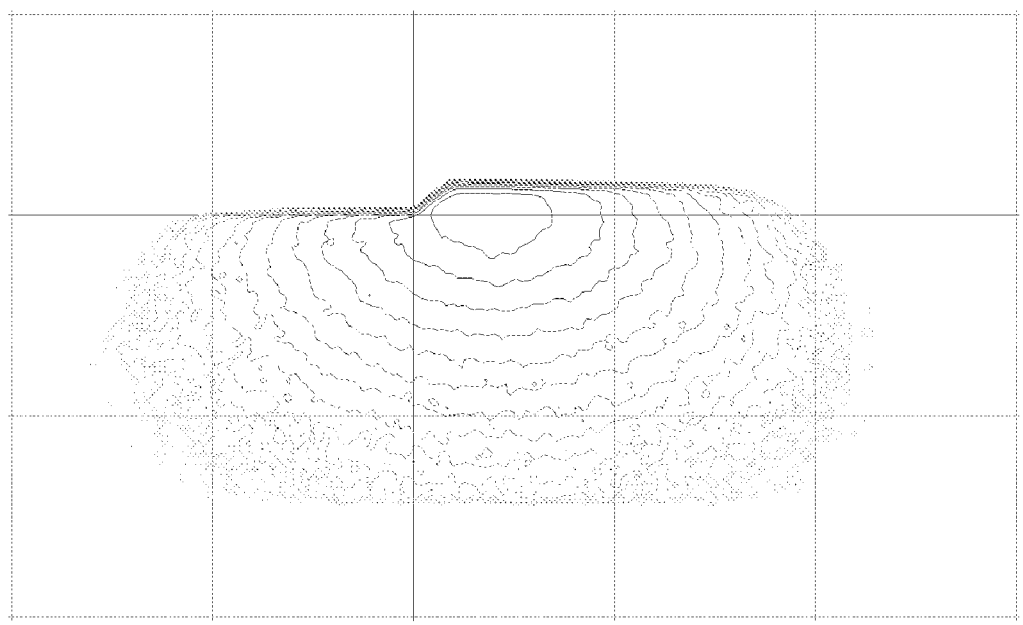
FIG. 14 is a schematic diagram of light shape effect of the vehicle lamp system of the fourth embodiment of the present application, wherein the optical lens is the optical lens of the first embodiment.

To adapt the optical lens of the present application to a general vehicle lamp system, as shown in FIG. 1, FIG. 7 and FIG. 12, the light source 3 is arranged near the focal point or in the focal area of the optical lens; or, as shown in FIG. 8 and FIG. 13, the optical lens of the present application can also be used as a secondary optical element. The primary optical element 4 converges the light emitted from the light source 3 to the focal point or focus area of the optical lens, and then the light is injected into the optical lens. Moreover, since the primary optical element 4 is provided with a cut-off structure for forming cut-off lines of light and dark, with reference to FIG. 13, a light shape with cut-off lines of light and dark as shown in FIG. 14 can be obtained. Wherein, the primary optical element 4 can be an optical element such as a mirror, a condenser or a spotlight cup. Similarly, the optical lens group of the present application can also be adapted to the general vehicle lamp system to obtain the same functions.

Figure 17:
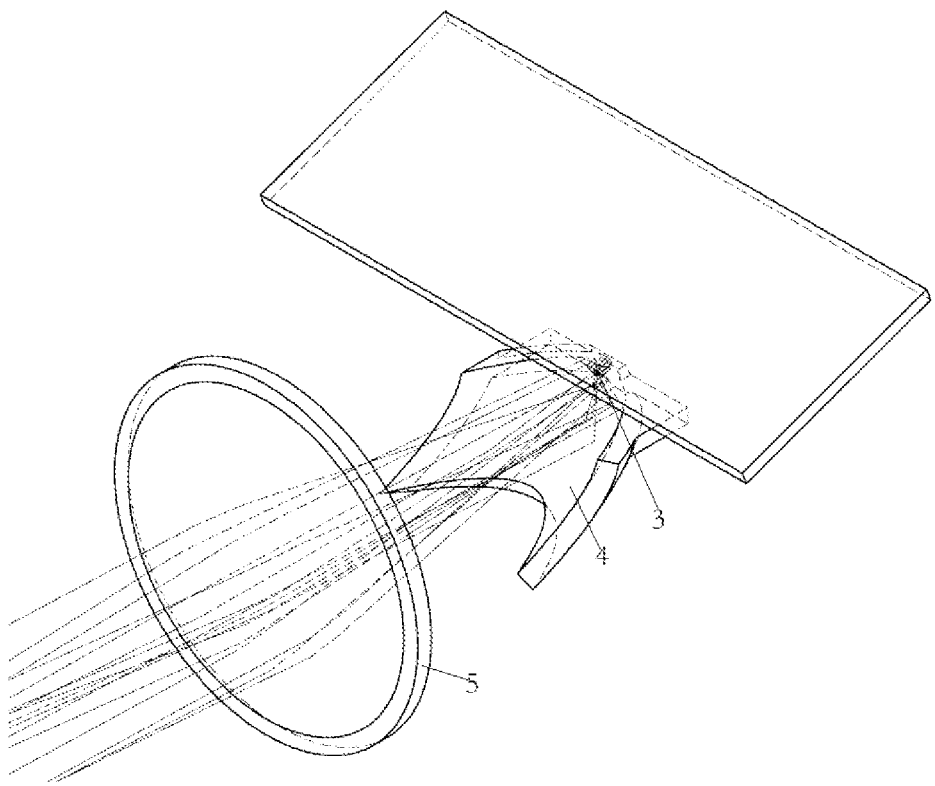
FIG. 17 is a schematic diagram of a three-dimensional light path of a lighting module in the prior art, wherein the optical lens is an existing hyperboloid collimating lens.
Figure 18:
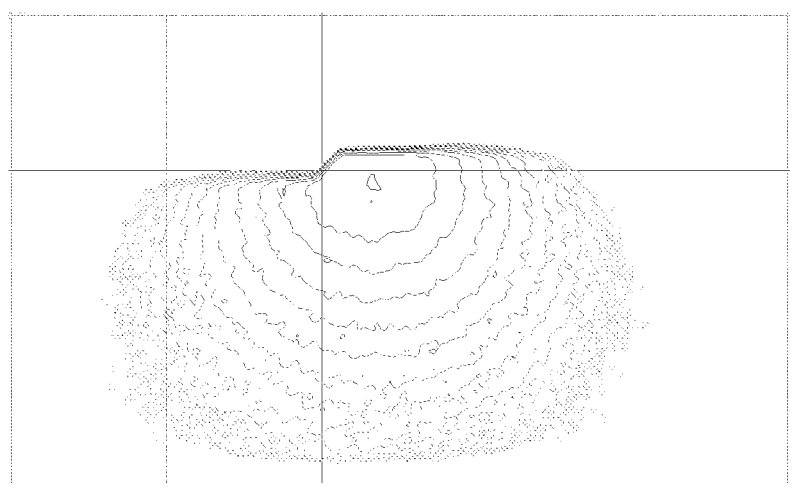
FIG. 18 is a schematic diagram of light shape effect of a lighting module in the prior art, wherein the optical lens is an existing hyperboloid collimating lens.

FIG. 17 shows an embodiment of a lighting module in prior art. A hyperboloid collimating lens 5 is used as a secondary optical element. A primary optical element 4 converges the light emitted from the light source 3 and then emits it to the hyperboloid collimating lens 5. Moreover, due to the effect of a cut-off structure provided on the primary optical element 4, a light shape with cut-off lines of bright and dark as shown in FIG. 18 can be obtained. Comparing the light shapes shown in FIG. 14 and FIG. 18, it can be clearly seen that the dimensions of the light shape in a horizontal direction and a vertical direction shown in FIG. 18 are relatively close to each other, approximately are square. However, the dimensions of the light shape in the horizontal direction and the vertical direction shown in FIG. 14 are quite different from each other. The light emitted from the light source 3 has diffusion degree in the horizontal direction more than that in the vertical direction, and the light shape is approximately rectangular. It can be seen from the above comparison that the optical lens of the present application can make the light shape have relatively obvious asymmetry. Compared with the prior art, there is no need to add additional optical elements to make the dimensions of the light shapes in the horizontal direction and the vertical direction have a certain difference, which simplifies the structure of the vehicle lamp to a certain extent.

In addition, as the optical lens of the present application can form a rectangular light shape, when arranging a vehicle lamp system in a vehicle lamp, taking two vehicle lamp systems as an example, one vehicle lamp system is arranged in a conventional manner, that is, forming a rectangular light shape along the horizontal direction; and the other vehicle lamp system is arranged obliquely, so that the light shape formed by the emitting by the corresponding optical lens is a rectangular light shape with a certain inclination. The two parts of the rectangular light shape are overlapped to form a light shape with cut-off lines of light and dark that meets the requirements. In the above embodiment, the optical lens can also be replaced by the optical lens group of the present invention, and the same function can also be achieved.

Since the vehicle of the present application adopts the above-mentioned optical lens or optical lens group, as for the corresponding lamp design, the vehicle lamp can be of a flat and wide shape, so that the front part of the vehicle can tend to a streamlined design, which is convenient to reduce the noise caused by the oncoming wind; and moreover, it has a better lighting effect.

The preferred embodiments of the present application have been described above in detail with reference to the drawings. However, the present application is not limited thereto. Within the scope of the technical concept of the present application, various simple modifications can be made to the technical solutions of the present application, including the combination of various specific technical features in any suitable manner. In order to avoid unnecessary repetition, various possible combinations will not be described in the present application. However, these simple modifications and combinations should also be regarded as the contents disclosed in the present application, and all belong to the protection scope of the present application.

What is claimed is:

1. An optical lens, comprising a light incident portion and a light emergent portion, wherein the light incident portion is provided with a first single-directional alignment surface, and the light emergent portion is provided with a second single-directional alignment surface, an alignment direction of the first single-directional alignment surface and an alignment direction of the second single-directional alignment surface are perpendicular to each other, and the first single-directional alignment surface and the second single-directional alignment surface jointly form a focal point or a focus area of the optical lens, wherein the first single-directional alignment surface and the second single-directional alignment surface cooperate with each other to make focal lengths on two sides of the optical lens different, so that an asymmetric light shape can be formed, wherein a length and a width of the asymmetric light shape are different.

2. The optical lens according to claim 1, wherein each of the first single-directional alignment surface and the second single-directional alignment surface is a curved surface formed by stretching of an collimating curve along a normal direction of a plane where the collimating curve is located.

3. The optical lens according to claim 2, wherein each of the first single-directional alignment surface and the second single-directional alignment surface is a cylindrical surface or a quasi-cylindrical surface.

4. The optical lens according to claim 3, wherein each of the first single-directional alignment surface and the second single-directional alignment surface is a circular-cylindrical surface.

5. The optical lens according to claim 4, wherein one of the alignment direction of the first single-directional alignment surface and the alignment direction of the second single-directional alignment surface is a vertical direction, and the other is a horizontal direction.

6. The optical lens according to claim 3, wherein one of the alignment direction of the first single-directional alignment surface and the alignment direction of the second single-directional alignment surface is a vertical direction, and the other is a horizontal direction.

7. The optical lens according to claim 2, wherein one of the alignment direction of the first single-directional alignment surface and the alignment direction of the second single-directional alignment surface is a vertical direction, and the other is a horizontal direction.

8. The optical lens according to claim 1, wherein each of the first single-directional alignment surface and the second single-directional alignment surface is a stepped Fresnel cylindrical surface.

9. The optical lens according to claim 8, wherein one of the alignment direction of the first single-directional alignment surface and the alignment direction of the second single-directional alignment surface is a vertical direction, and the other is a horizontal direction.

10. The optical lens according to claim 1, wherein one of the first single-directional alignment surface and the second single-directional alignment surface is a cylindrical surface, and the other is a stepped Fresnel cylindrical surface.

11. The optical lens according to claim 10, wherein one of the alignment direction of the first single-directional alignment surface and the alignment direction of the second single-directional alignment surface is a vertical direction, and the other is a horizontal direction.

12. The optical lens according to claim 1, wherein one of the alignment direction of the first single-directional alignment surface (1) and the alignment direction of the second single-directional alignment surface is a vertical direction, and the other is a horizontal direction.

13. The optical lens according to claim 1, wherein the first single-directional alignment surface and the second single-directional alignment surface cooperate with each other to make focal lengths on two sides of the optical lens different, so that an asymmetric light shape can be formed.

14. A vehicle lamp system, comprising the optical lens according to claim 1.

15. The vehicle lamp system according to claim 14, further comprising a light source, wherein the light source is arranged at the focal point or the focus area of the optical lens or the optical lens group; or, it further comprises a light source and a primary optical element, wherein the primary optical element is arranged to be able to converge light emitted by the light source to the focal point or the focus area of the optical lens or the optical lens group and make it introduced into the optical lens or the optical lens group.

16. An optical lens group, comprising optical lens, wherein each of the optical lens comprises a light incident portion and a light emergent portion, wherein the light incident portion is provided with a first single-directional alignment surface, and the light emergent portion is provided with a second single-directional alignment surface, an alignment direction of the first single-directional alignment surface and an alignment direction of the second single-directional alignment surface are perpendicular to each other, and the first single-directional alignment surface and the second single-directional alignment surface jointly form a focal point or a focus area of the optical lens, and the optical lens group comprises a first single-directional collimating lens group and a second single-directional collimating lens group, wherein the first single-directional collimating lens group and the second single-directional collimating lens group jointly form a focal point or a focus area of the optical lens group, and an alignment direction of the first single-directional collimating lens group and an alignment direction of the second single-directional collimating lens group are perpendicular to each other, wherein the first single-directional alignment surface and the second single-directional alignment surface cooperate with each other to make focal lengths on two sides of the optical lens different, so that an asymmetric light shape can be formed, wherein a length and a width of the asymmetric light shape are different.

17. The optical lens group according to claim 16, wherein each of the first single-directional collimating lens group and the second single-directional collimating lens group is composed of at least one single-directional collimating lens.

18. The optical lens group according to claim 17, wherein one of an incident surface and an emergent surface of the single-directional collimating lens is a single-directional collimating curved surface, or both of them are single-direction collimating curved surfaces with a same collimating direction.

19. The optical lens group according to claim 16, wherein the first single-directional collimating lens group and the second single-directional collimating lens group are connected by a side wall.

20. A vehicle lamp system, comprising the optical lens group according to claim 16.

* * * * *